Oct. 30, 1928.
F. HEATH
1,689,919
FISH DIRECTING AND TURNING APPARATUS
Filed Dec. 7, 1926
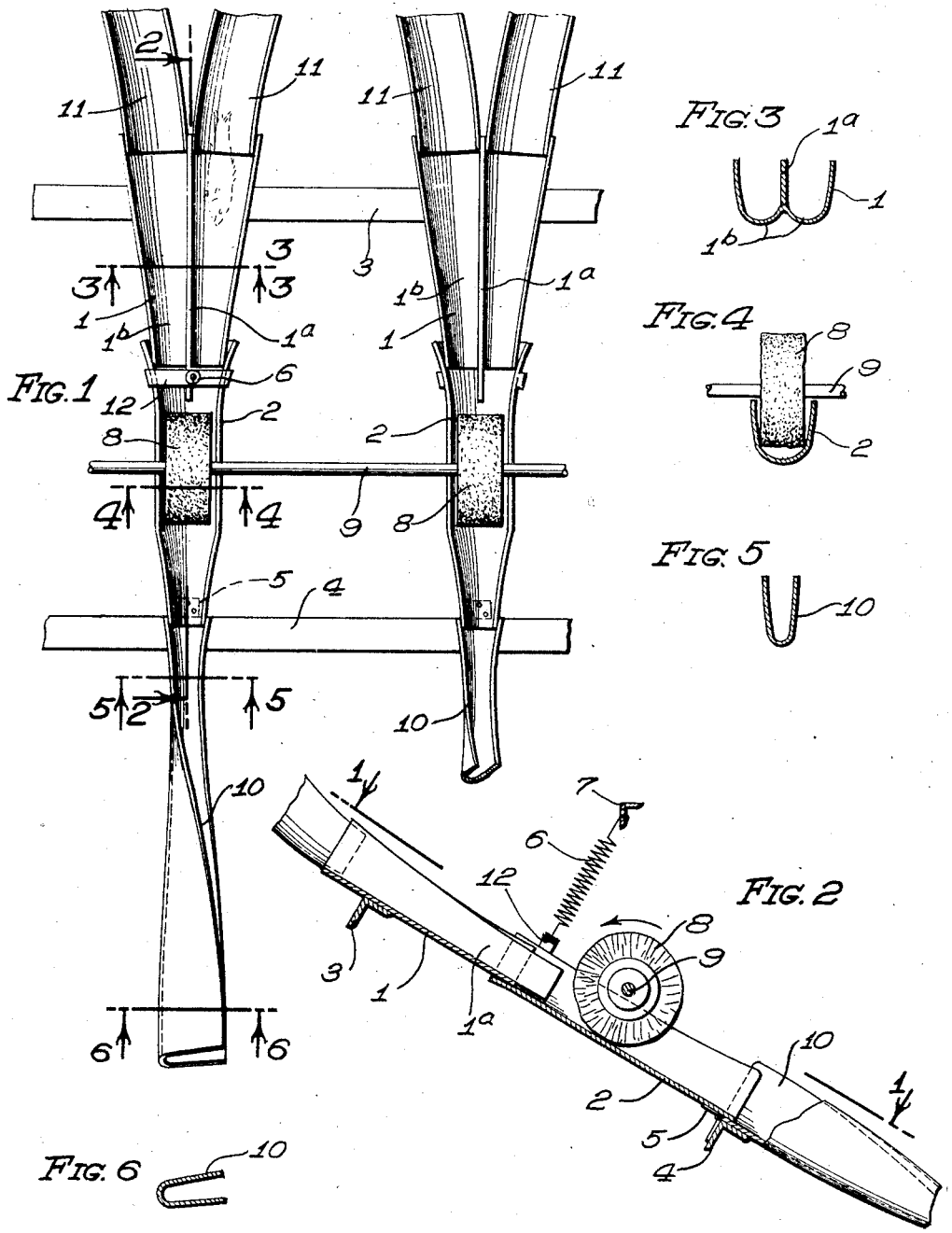
INVENTOR.
FRANK HEATH
BY A.B.Bowman
ATTORNEY Patented Oct. 30, 1928.

1,689,949

UNITED STATES PATENT OFFICE.

FRANK HEATH, OF NATIONAL CITY, CALIFORNIA.

FISH DIRECTING AND TURNING APPARATUS.

Application filed December 7, 1926. Serial No. 153,056.

My present invention relates to an apparatus for receiving fish after the same are segregated and directing and turning the same preparatory to being beheaded.

The primary object of this invention is to provide improvements over my co-pending application for fish segregating, directing, guiding and turning apparatus, filed in the United States Patent Office June 25th, 1925, Serial No. 39,557.

The objects of my improvements are: first, to provide an apparatus of this class for receiving fish from a means in which the fish have been previously segregated and directed with their heads in one direction, the apparatus serving to lay the fish substantially flatwise with all the backs of the fish at one side; second, to provide an apparatus of the class mentioned for checking the speed of the fish as the same enter the directing and turning apparatus from the means for segregating and directing the heads in one direction; third, to provide an apparatus of this class whereby the fish will be fed at more regular intervals from the segregating and head directing means to the head removing means; fourth, to provide a speed checking means of this class whereby the fish will not double up by sudden impact therewith; fifth, to provide a means of this class which will direct, check the speed of, and turn on their backs fish of various sizes without change of construction or without adjustment; sixth, to provide novel chute means for turning fish from their backs onto their sides with their backs at one side of the chute; and seventh, to provide as a whole a novelly constructed apparatus of this class and one which is particularly simple and economical of construction, durable, efficient and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application in which:

Figure 1 is a fragmentary view taken on the line 1—1 of Fig. 2, showing two of a battery of such apparatus; Fig. 2 is a fragmentary sectional view thereof taken through 2—2 of Fig. 1, showing certain parts and portions in elevation to facilitate the illustration; and Figs. 3, 4, 5 and 6 are transverse sectional views of the chutes taken respectively on the lines 3—3, 4—4, 5—5 and 6—6 of Fig. 1.

Like characters of reference refer to similar parts and portions throughout the several views of the drawings.

The stationary chute 1, movable chute 2, supports 3 and 4, hinge 5, spring 6, support 7, brush 8, shaft 9, and the fish turning chute constitute the principal parts and portions of my fish directing and turning apparatus.

My fish directing and turning apparatus, as shown in the drawings, is positioned at an angle with the horizontal plane so that the fish may be fed by gravity from the means for segregating the fish and directing the heads thereof in one direction, not shown, to the means for beheading the fish, also not shown. The chute 1 receives the fish at its upper or head end from a chute 11 which receives the fish, heads foremost, from the directing and segregating means. The chute 1 is provided with a longitudinally extending central partition 1ª which divides said chute into two channels 1ᵇ, said channels converging slightly from their upper or head ends toward their lower or discharge ends. Into each of the head ends of the channels 1ᵇ, are directed the discharge ends of separate chutes 11, the separate chutes 11 directed into one chute 1, being preferably connected with a single unit of the fish directing and segregating means. The chute 1 is supported on a support 3 which may be in the form of an angle iron and which extends across the machine for supporting a battery of directing and turning units.

A considerable distance from the support 3, is another similar support 4 on which is mounted and fixed the upper or head end of the turning chute 10, which is in alignment with the chute 1. Connecting the chutes 1 and 10, is an intermediate movable chute 2 which is supported near its discharge end, by means of the hinge 5, on the support 4, the discharge end of the chute 2 extending into the chute 10 and the opposite end of the former being positioned around the discharge end of the chute 1. Thus, the head end of the connecting chute 2 is permitted to be shifted downwardly relative to the chute 1. The head end of the chute 2 is normally held in an upward position, or in engagement with the discharge end of the chute 1 by a spring means which consists of a spring 6 secured at one end to a suitable support 7 and at its opposite end to the free end of the chute 2, the latter connection being preferably made by means of a band 12 straddling and secured to the lateral side of the chute 2 near the free end of the latter, as shown in Figs. 1 and 2.

Within the chute 2 and immediately below the discharge end of the chute 1, is positioned a circular brush 8 of relatively large diameter, which brush is mounted on a shaft 9 revolving in the direction shown by the arrow. The bristle portion of the brush substantially fills the chute 2, as shown in Figs. 1 and 4, so that no fish can pass through the chute 2 without engaging the brush. Said brush is preferably provided with long bristles so that the same may yield readily, or the same may be made of other readily yieldable material. It will be noted that the member 8 may be made as a drum provided with suitable projections, and the spring 6 may be correspondingly yieldable to prevent the fish from being mashed between the chute and the member 8.

The head end of the chute 2 is relatively wide and is adapted to receive the fish flatwise with their heads foremost. After the fish pass under the brush, the same are turned from their sides onto their backs by the pressure of the brush forcing the thickest portion of the fish which is their backs, to the center and bottom of the chute because of its greater depth at that point. The head end of the chute 10 is also narrow and receives the fish while on their backs and with their heads foremost. The chute 10 is of substantially the same cross section from end to end, but the perpendicular axis of the channel therein is gradually turned from a vertical position at the head end to an almost horizontal position at the discharge end. Thus, the fish, entering the chute 10 on their backs, are turned gradually on their sides with their backs at the same side of the chute. Thus, the fish all assume the same position before entering the beheading machine above referred to.

The fish enter the channels of the chute 1 at considerable velocity but their speed is checked on reaching the brush 8 and all fish leave the brush at a uniform speed. Also, as the fish pass into the chute 1, or before leaving the chutes 11, the fish may be distorted, but as the same pass under the brush 8, the same are ironed out and are forced to assume uniform positions in the chute 2. The resilient mounting of the free end of the chute 2 permits the apparatus to accommodate many sizes of fish. Said brush also times the fish in their passage from the segregating and directing means to the beheading means.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a speed checking apparatus of the class described, an unobstructed fish directing chute adapted to receive fish on their normally flat sides, and a circular brush mounted on an axis transverse with the axis of the chute and extended with its bristles into the latter for engaging the upwardly turned normally flat side of a fish.

2. In a speed checking apparatus of the class described, an unobstructed inclined fish directing chute, and a brush revolubly mounted adjacent thereto with its axis extending transversely with respect to the axis of the chute and with its bristles extending into the same for engaging a normally flat side of a fish in the chute.

3. In a speed checking apparatus of the class described, an inclined fish directing chute, and a revoluble member mounted adjacent thereto on an axis transverse with the longitudinal axis of the chute and extending into the same for engaging a normally flat side of a fish in the chute.

4. In a speed checking apparatus of the class described, an inclined chute, a revoluble member mounted adjacent thereto on an axis transverse with the longitudinal axis of the chute and extending into the same for engaging a normally flat side of a fish in the chute, and means for revolving said revoluble member.

5. In an apparatus of the class described, a stationary chute, a movable chute pivotally mounted at one end and extended with its opposite end under the one end of said stationary chute, and revoluble means mounted above said movable chute for forcing fish passing through the same against the bottom thereof.

6. In an apparatus of the class described, a stationary chute, a movable chute pivotally mounted at one end and extended with its opposite end under the one end of said stationary chute, revoluble means mounted above said movable chute for forcing fish passing through the same against the bottom thereof, and yielding means for normally forcing the end of the movable chute, extended under the stationary chute, in close proximity to the latter.

7. In an apparatus of the class described, an inclined stationary chute, an inclined movable chute, the latter being pivotally mounted at its lower end and extended with its opposite free end below the lower end of said stationary chute, and a revoluble brush mounted above said movable chute and extended into the same.

8. In an apparatus of the class described, an inclined stationary chute, an inclined movable chute, the latter being pivotally mounted at its lower end and extended with its opposite free end below the lower end of said stationary chute, a revoluble brush mounted above said movable chute and extended into the same, and a spring means connected with the free end of the movable chute for normally forcing the same toward said stationary chute and toward said brush.

9. In an apparatus of the class described, chute means having separate fish directing passages, a movable chute pivotally mounted at one end and extended with its opposite end to communicate with each of the passages of said chute means, and a revoluble member mounted above said movable chute and extending into the same for forcing fish from each of said channels against the bottom of said movable chute.

10. In an apparatus of the class described, an inclined chute means having separate channels at one end merging into a unitary channel, and a brush revolubly mounted above said unitary channel and extending into the same.

In testimony whereof, I have hereunto set my hand at San Diego, California, this 27 day of November, 1926.

FRANK HEATH.